United States Patent [19]

Dshkhunian et al.

[11] 4,451,882
[45] May 29, 1984

[54] DATA PROCESSING SYSTEM

[76] Inventors: Valery L. Dshkhunian, K-482, korpus 338-A, kv. 73; Eduard E. Ivanov, 14 Parkovaya ulitsa, 16, kv. 6; Sergei S. Kovalenko, K-498, korpus 421, kv. 3; Pavel R. Mashevich, K-482, korpus 338-A, kv. 139; Alexei A. Ryzhov, K-527, korpus 848, kv. 63; Vyacheslav V. Telenkov, K-527, korpus 811, kv. 75; Jury E. Chicherin, K-460, korpus 161, kv. 31, all of Moscow, U.S.S.R.

[21] Appl. No.: 323,276

[22] Filed: Nov. 20, 1981

[51] Int. Cl.³ .................... G06F 9/18; G06F 9/16; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,614,740 | 10/1971 | Delagi et al. | 364/200 |
| 3,665,404 | 5/1972 | Werner | 364/200 |
| 3,896,418 | 7/1975 | Brown | 364/200 |
| 4,077,060 | 2/1978 | Bodner et al. | 364/200 |
| 4,151,592 | 4/1979 | Suzuki et al. | 364/200 |
| 4,156,278 | 5/1979 | Wilhite | 364/200 |

OTHER PUBLICATIONS

"Multiprocessing Adds Muscle to PS", Electronic Design No. 11, 1978, pp. 238–244.

Primary Examiner—Charles E. Atkinson
Assistant Examiner—William G. Niessen
Attorney, Agent, or Firm—Lilling & Greenspan

[57] ABSTRACT

A data processing system intended for handling multiple tasks and comprising at least two processors, a memory unit and an I/O unit which are all connected to a data address and control signal transmission line. Each of the processors comprises an arithmetic-logic unit, a scratch pad memory, a processor status register, an interface, and a control unit which are all interconnected by a processor data bus. Each of the processors further contains an address interrupt unit whose input/output is connected to the data address and control signal transmission line. A first output of the address interrupt unit is connected to the processor data bus and its second output is connected to a second input of the control unit. A second control output of the control unit is connected to the input of the address interrupt unit. The invention helps increase the throughput of a data processing system and simplify the programming of interaction between the system's processors.

3 Claims, 5 Drawing Figures

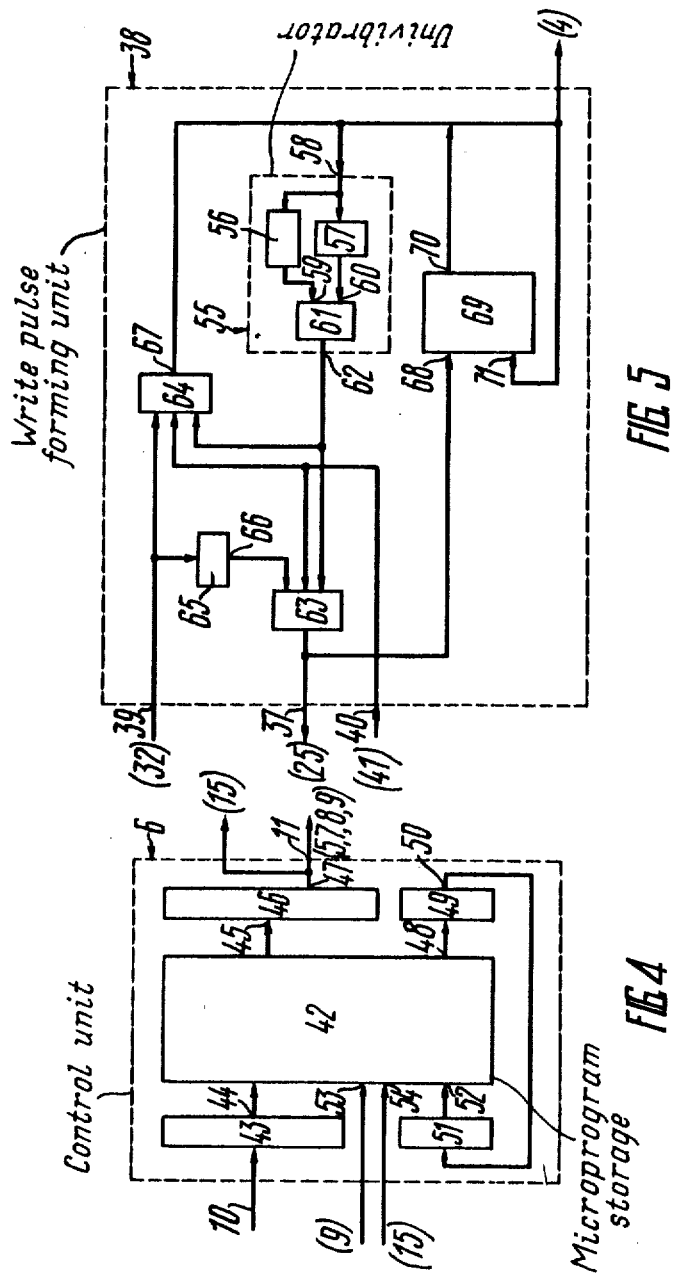

DATA PROCESSING SYSTEM

FIELD OF THE INVENTION

The present invention relates to digital computers and, more particularly, to data processing systems.

The invention is applicable to the designing of multiprocessor/multiprogram data processing systems with intense interaction between the processors. Data processing systems of this type are normally used in process control systems.

DESCRIPTION OF THE PRIOR ART

There is known a data processing system (cf. U.S. Pat. No. 3,614,740, (1971) including a memory unit for storing related operating routine instructions as operating program subroutines and interruption routines, and a processor unit for processing instructions conveyed thereto in sequence from locations in said memory unit identified by a program counter. The memory unit of the system has a succession of vacant locations and a register for providing addresses of the vacant locations in said memory unit. The system also contains a processor control unit. In case of interrupting a routine, this latter unit controls an instruction counter and processor status register and selects new contents for them from two adjacent memory locations, using an interrupt vector.

The foregoing principles are used in PDP data processing systems designed and manufactured by DEC (Digital Equipment Corp.) and well known to those skilled in the art. A transfer to subroutines and interrupt routines facilitates programming and interaction with peripheral devices and makes it possible to have internal interrupt processing procedures.

The data processing system under review is disadvantageous in that it comprises only one processor so that its throughput is limited to that of the processor.

From the technical standpoint, the closest prototype of the present invention is a data processing system intended for handling multiple tasks (cf. "Multiprocessing Adds Muscle to µPS", Electronic Design No. 11, 1978, pp. 238-244) and comprising at least two processors for data processing, a memory unit for storing programs and data, and an interface. The data address and control signal transmission line is, in this case, the common bus for transmission of data address and control signals for at least two processors.

Each processor of the system comprises an arithmetic-logic unit for performing arithmetic and logic operations in the course of data processing, a scratch pad memory for storing intermediate results in the course of data processing, an interface which enables the processor to interact through the data address and control signal transmission line with the memory unit, input/output unit and other processors, a processor status register for storing the current status of the processor, and a control unit to produce signals to control the processor units and the processor status register in the course of data processing. All these units are interconnected by a processor data bus. A first control output of the control unit is connected to control inputs of the arithmetic-logic unit, scratch pad memory, interface and processor status register. An input/output of the arithmetic-logic unit is connected to an input/output of the processor status register, whose output is connected to a first input of the control unit. An input/output of the interface is connected to the data address and control signal transmission bus. The processor also contains an internal clock pulse generator connected to inputs of the interface and control unit. There is also a counter-type adder connected to the processor data bus. The interface comprises an address register, a bidirectional buffer element and a synchronization unit.

The interaction between the system's processors is effected through what is known as test-and-set instructions which are executed on a continuous basis. These instructions analyze the state of an identified memory location. If the location contains a message calling for the execution of a routine, it is transmitted to the processor which starts executing the routine and sends out a message to this effect. In order to avoid conflicts, the analysis of the memory location and the entering of new contents into it must be done continuously. However, the necessity of scanning memory locations affects the throughput of the system. The necessity of programming successions of interacting instructions makes the system's software too complicated.

SUMMARY OF THE INVENTION

It is an object of the present invention to provide a data processing system with an increased throughput.

It is another object of the invention to provide a data processing system with a simplified software.

The invention consists in providing a data processing system intended for handling multiple tasks and comprising at least two processors intended for data processing, a memory unit for storing programs and data, and an input/output unit which are all connected to a data address and control signal transmission line. Each of the processors comprises a processor data bus to interconnect an arithmetic-logic unit intended to perform arithmetic and logic operations in the course of data processing, a scratch pad memory for storing intermediate results in the course of data processing, a processor status register for storing the current processor status word, and an interface to enable the processor to interact through the data address and control signal transmission line with the memory unit, the input/output unit and other processors. Each of the processors also contains a control unit which forms signals to control the arithmetic-logic unit, the scratch pad memory, the interface and the processor status register. A first control output of the control unit is connected to control inputs of the arithmetic-logic unit, scratch pad memory, interface and processor status register; an input/output of the arithmetic-logic unit is connected to an input/output of the processor status register; an output of the processor status register is connected to a first input of the control unit; and, an input/output of the interface is connected to the data address and control signal transmission line. According to the invention, each of the processors comprises an address interrupt unit for interrupting the execution of a program by the processor, which address interrupt unit uses addressing means of memory locations of each processor and has its first input/output connected to the data address and control signal transmission line, its first output connected to the processor data bus, and a second output connected to a second input of the control unit. A second control output of the control unit is connected to an input of the address interrupt unit.

It is expedient that the address interrupt unit include a group of interrupt vector registers wherein each register has its first input connected to the input/output of the address interrupt unit and an output connected to the first output of the address interrupt unit. A first group of AND gates and a second group of AND gates having outputs of the AND gates connected to a first control input and a second control input, respectively, of a respective register of the group of interrupt vector registers. A first priority circuit and a second priority circuit have outputs connected to first inputs of the AND gates of the first and second groups of AND gates, respectively. Second inputs of the AND gates of the first group are connected to inputs of the address interrupt unit. Also included are one more AND gate, an OR gate and a status register. The status register has a first input connected to the outputs of the AND gates of the first group, a second input connected to the outputs of the AND gates of the second group, a first output connected to the input of the first priority circuit, the input of the AND gate and the input of the OR gate, and a second output connected to the input of the second priority circuit. The OR gate has its output connected to the second output of the address interrupt unit. A write pulse forming unit has a first input connected to the output of the AND gate and an output connected to second inputs of the AND gates of the second group of AND gates. An address decoder has an output connected to a second input of the write pulse forming unit. An input/output of the write pulse forming unit and an input of the address decoder are connected to the input/output of the address interrupt unit.

It is advisable that the control unit should incorporate an instruction register; a microprogram storage which is a programmable logic matrix having its first input connected to an output of the instruction register whose input is connected to the processor data bus; a microinstruction register whose input is connected to a first output of the microprogram storage and whose output is connected to the first and second control outputs of the control unit; a current microinstruction adress register; and a next microinstruction address register whose input is connected to a second output of the microprogram storage and whose output is connected to an input of the current microinstruction address register which has its output connected to a second input of the microprogram storage whose third input and fourth input are connected to the first input and second input, respectively, of the control unit.

It is desirable that the write pulse forming unit should incorporate a univibrator comprising a delay circuit, an inverter and a NOR gate, the delay circuit and inverter having their inputs connected to an input of the univibrator and their outputs connected to a first input and a second input, respectively, of the NOR gate whose output is connected to the output of the univibrator. A first AND gate and a second AND gate have first and second inputs connected to the output of the univibrator and the second input of the write pulse forming unit, respectively. A third input of the second AND gate is connected to the first input of the write pulse forming unit. An inverter has an output connected to a third input of the first AND gate and an input connected to the first input of the write pulse forming unit. An output of the first AND gate is connected to the output of the write pulse forming unit and to a first input of a flip-flop whose second input, the input of the univibrator, an output of the second AND gate and an output of the flip-flop are connected to the input/output of the write pulse forming unit.

The introduction of an address interrupt unit into each processor increases the throughput of the data processing system, because it is no longer necessary to scan memory locations. This feature also simplifies the programming of interaction between the processors. The use of a single data address and control signal transmission line for interaction between the processors accounts for a relatively small amount of hardware in the system.

BRIEF DESCRIPTION OF THE DRAWINGS

Other objects and advantages of the present invention will become more apparent from a consideration of the following detailed description of a preferred embodiment thereof, taken in conjunction with the accompanying drawings, wherein:

FIG. 4 is a block diagram of a control unit in accordance with the invention; and FIG. 5 is a block diagram of a write pulse forming unit in accordance with the invention.

DETAILED DESCRIPTION OF THE INVENTION

Figure 1:
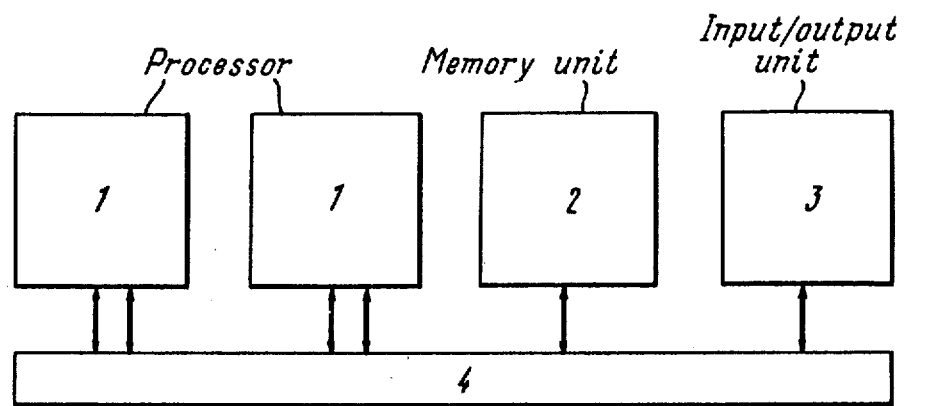
FIG. 1 is a block diagram of a data processing system in accordance with the invention.

Referring to the attached drawings, the data processing system according to the invention is intended for handling multiple tasks and comprises at least two processors 1 (FIG. 1) intended for data processing, a memory unit 2 for storing programs and data, and an input/output unit 3, which are all interconnected by a data address and control signal transmission line 4. In the simplest case, the data address and control signal transmission line 4 is a common data address and control signal bus. Each of the processors 1 comprises an arithmetic-logic unit 5 (FIG. 2), a control unit 6, and a scratch pad memory 7 including an instruction counter, index registers and registers of intermediate computation results (not shown). The processor 1 also contains an interface 8 and a processor status register 9. All the foregoing units of the processor 1 are interconnected by a processor data bus 10. A first control output 11 of the control unit 6 is connected to control inputs of the arithmetic-logic unit 5, scratch pad memory 7, interface 8 and processor status register 9. An input/output 12 of the register 9 is connected to an input/output of the arithmetic-logic unit 5, and an output 13 is connected to a first input of the control unit 6. An input/output 14 of the interface 8 is connected to the data address and control signal transmission line 4.

The processor 1 further contains an address interrupt unit 15 whose input/output 16 is connected to the data address and control signal transmission line 4. A first output of the address interrupt unit 15 is connected to the processor data bus 10. A second output 17 of the address interrupt unit 15 is connected to a second input of the control unit 6 whose second control output is connected to an input 18 of the address interrupt unit 15. The arithmetic-logic unit 5 performs arithmetic and logic operations in the course of data processing. The scratch pad memory 7 is intended for storing intermediate results in the course of data processing. The processor status register 9 is intended for storing the current processor status word. The control unit 6 forms signals to control the arithmetic-logic unit 5, scratch pad memory 7, interface 8 and processor status register 9. The interface 8 provides for interaction of the processor 1 with the memory unit 2, input/output unit 3 and other processors 1 through the data address and control signal transmission line 4.

The address interrupt unit 15 (FIG. 3) comprises a group 19 of interrupt vector registers 20. Inputs of each of the registers 20 are connected to the input/output 16 of the interrupt address unit 15. Outputs 21 of each of the registers 20 are connected to the first output of the interrupt address unit 15. A first control input and a second control input of each of the interrupt vector registers 20 of the group 19 are connected to outputs 22 and 23 of respective AND gates 24 and 25 of groups 26 and 27 of AND gates, respectively. The outputs 22 and 23 of each of the AND gates of the first group 26 and second group 27 of AND gates are connected to a first input and a second input, respectively, of a status register 28 intended to store the status of the address interrupt unit 15. The status register 28 has a paraphase output. A first output 29 of the register 28 is connected to inputs of a first priority circuit 30, an OR gate 31 and an AND gate 32. A second output 33 of the status register 28 is connected to an input of a second priority circuit 34. Outputs 35 and 36 of the first and second priority circuits 30 and 34, respectively, are connected to first inputs of each of the AND gates 24 and 25 of the first and second groups 26 and 27 of AND gates, respectively. Second inputs of each of the AND gates 24 of the first group 26 are connected to the input 18 of the address interrupt unit 15. An output of the OR gate 31 is connected to the second output 17 of the address interrupt unit 15. Second inputs of each of the AND gates 25 of the second group 27 of AND gates are connected to an output 37 of a write pulse forming unit 38. A first input 39 of the write pulse forming unit 38 is connected to an output of the AND gate 32, and a second input 40 is connected to an output of an address decoder 41 whose input and an input/output of the write pulse forming unit 38 are connected to the input/output 16 of the address interrupt unit 15.

The control unit 6 (FIG. 4) comprises a microprogram storage 42 which is a programmable logic matrix, and an instruction register 43 whose input is connected to the processor data bus 10. An output 44 of the instruction register 43 is connected to a first input of the microprogram storage 42. A first output of the microprogram storage 42 is connected to an input 45 of a microinstruction register 46 whose output 47 is connected to the first output 11 and the second control output of the control unit 6. A second output 48 of the microprogram storage 42 is connected to an input of a next microinstruction address register 49 whose output 50 is connected to an input of a current microinstruction address register 51 having its output connected to a second input 52 of the microprogram storage 42. A third input 53 and a fourth input 54 of the microprogram storage 42 are connected to the first input and second input, respectively, of the control unit 6.

The write pulse forming unit 38 (FIG. 5) comprises a univibrator 55 which contains a delay circuit 56 and an inverter 57 which have their inputs connected to an input 58 of the univibrator 55 and their outputs connected to a first input 59 and a second input 60, respectively, of a NOR gate 61. An output of the NOR gate 61 is an output 62 of the univibrator 55. The input 58 of the univibrator 55 is connected to the input/output of the write pulse forming unit 38. The output 62 of the univibrator 55 is connected to first inputs of a first AND gate 63 and a second AND gate 64 whose second inputs are connected to the second input 40 of the write pulse forming unit 38. The first input 39 of the write pulse forming unit 38 is connected to a third input of the second AND gate 64 and to an input of an inverter 65 whose output 66 is connected to a third input of the first AND gate 63. An output 67 of the second AND gate 64 is connected to the input/output of the write pulse forming unit 38. An output of the first AND gate is connected to the output 37 of the write pulse forming circuit 38 and to a first input 68 of a flip-flop 69. An output 70 and a second input 71 of the flip-flop 69 are connected to the input/output of the write pulse forming unit 38.

Figure 2:
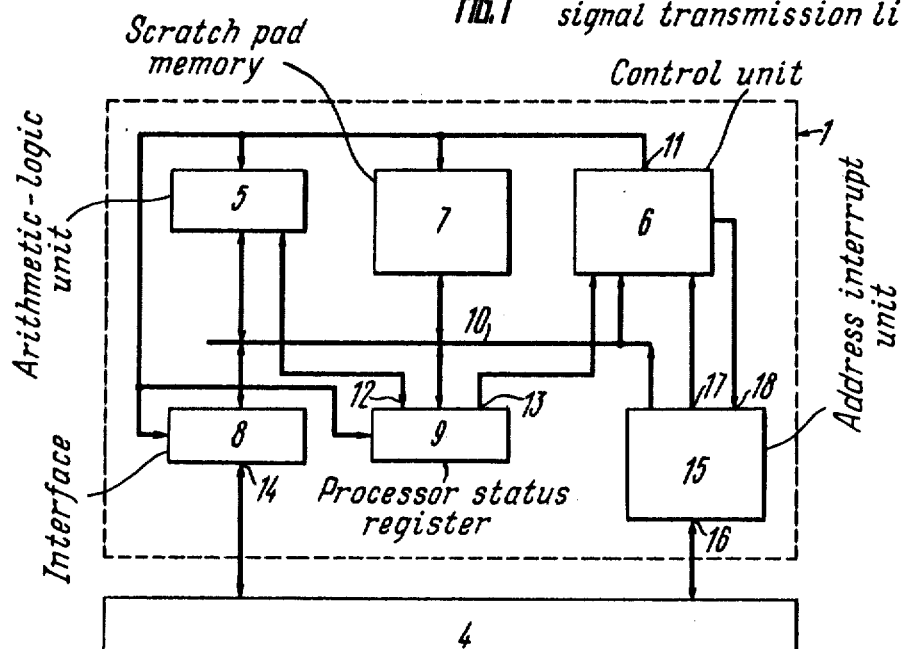
FIG. 2 is a block diagram of a processor in accordance with the invention.

The data processing system according to the invention is meant to operate in the multiprogram mode. The processors 1 (FIG. 1) of the system are intended to handle a succession of tasks. Programs and data for each task are entered into the memory unit 2 via the input-/output unit 3. An exchange of information within the system is carried out through the data address and control signal transmission line 4. In order to ensure the execution of any program by any of the processors 1, each program has a title containing all information necessary to carry out the program. More specifically, the title indicates the initial contents of the instruction counter, the processor status register 9 (FIG. 2) and scratch pad memory. The program title reserves some space for internal procedures. Apart from programs and their titles, the memory unit 2 (FIG. 2) contains an array of references to program titles. The interaction between the processors 1 is effected by means of vector interruptions. An interruption is realized by transmitting an interrupt vector through the data address and control signal transmission line 4 to the address interrupt unit 15 (FIG. 2). Upon receiving the interrupt vector, the address interrupt vector unit 15 forms an interrupt signal at its second output 17. This signal is applied to the second input of the control unit 6 which produces a required sequence of control signals if the status of the processor 1, stored in the processor status register 9, is such that an interruption is possible, otherwise the interruption is put off until the status of the processor 1 is changed. The interruption procedure consists in forming a current title of the program to be executed, for which purpose the current status of the scratch pad memory of the processor 1 and the current status of the processor status register 9 are introduced into the title. This being done, the control unit 6 produces a signal at the input 18 of the address interrupt unit 15, which controls the transmission of the interrupt vector to the processor data bus 10; this vector is subsequently used as the address of the reference to the title of the new program. Using the reference, the processor 1 enters new contents, in accordance with the program title, in the processor status register 9 and scratch pad memory 7; it also includes a reference to the title of the interrupted program in the title of the new program. Upon completing the new program, the processor 1 uses the reference to go back to the interrupted program. This is the way internal procedures are realized in the system.

The control of the data exchange and modifications of memory addresses and program execution are carried out through joint operation of the arithmetic-logic unit 5, interface 8, scratch pad memory 7 and processor status register 9. The interaction of these units is controlled by signals produced by the control unit 6.

The address interrupt unit 15 performs its functions with the aid of the group 19 (FIG. 3) of interrupt vector registers into which interrupt vectors are written. The number of interrupt vector registers 20 in the group 19 is determined by the frequency of interruptions; in any case, the group 19 must contain at least one register 20. In the embodiment under review, there are three registers 20 in the group 19; there are also three AND gates 24 and 25 in each of the groups 26 and 27 of AND gates. Likewise, there are three digits in the register 28 for storing the status of the address interrupt unit 15.

Using control signals transmitted over the data address and control signal transmission line 4 (FIG. 2), the write pulse forming unit 38 produces a pulse at its output 37 (FIG. 3) if at the output of the address decoder 41 there is a signal indicating that the transmitted address is meant for the address interrupt unit 15. The pulse is applied to the inputs of the AND gates 25 of the second group 27 of AND gates. At the output of one of the AND gates 25 of the second group 27 there is produced a write pulse for writing into a register 20 of the group 19. At the same time the digit of the status register 28 of the address interrupt unit 15, corresponding to the given register 20 of the group 19, is brought to the "1" state. The first priority circuit 30 identifies the top priority register 20 into which an interrupt vector has been entered. The second priority circuit 34 identifies the top priority register 20 among those into which no interrupt vector has been entered. For this purpose, the input of the first priority circuit 30 receives a signal from the first output 29 of the status register 28 of the address interrupt unit 15; the input of the second priority circuit 34 receives a signal from the second output 33 of the register 28. From the input 18 of the address interrupt unit 15, the signal is applied to the inputs of the AND gates 24 of the first group 26 of AND gates, whereby the information contained in one of the registers 20 of the group 19 is passed to the first output of the address interrupt unit 15. The digit of the status register 28 of the unit 15, corresponding to this register 20, is zeroed so that this register 20 is free to receive fresh information. The presence of at least one unity in the status register 28 of the address interrupt unit 15 causes a "1" signal to appear at the output of the OR gate 31. This signal is applied to the second output 17 of the address interrupt unit 15 to indicate that an interruption is necessary. If the status register 28 of the address interrupt unit 15 contains all unities, a "1" signal is produced at the output of the AND gate 32 to change the algorithm of operation of the write pulse forming circuit 38. Instead of producing a write pulse, the unit 38 forms a signal to indicate that all the registers 20 of the group 19 are full.

Figure 3:
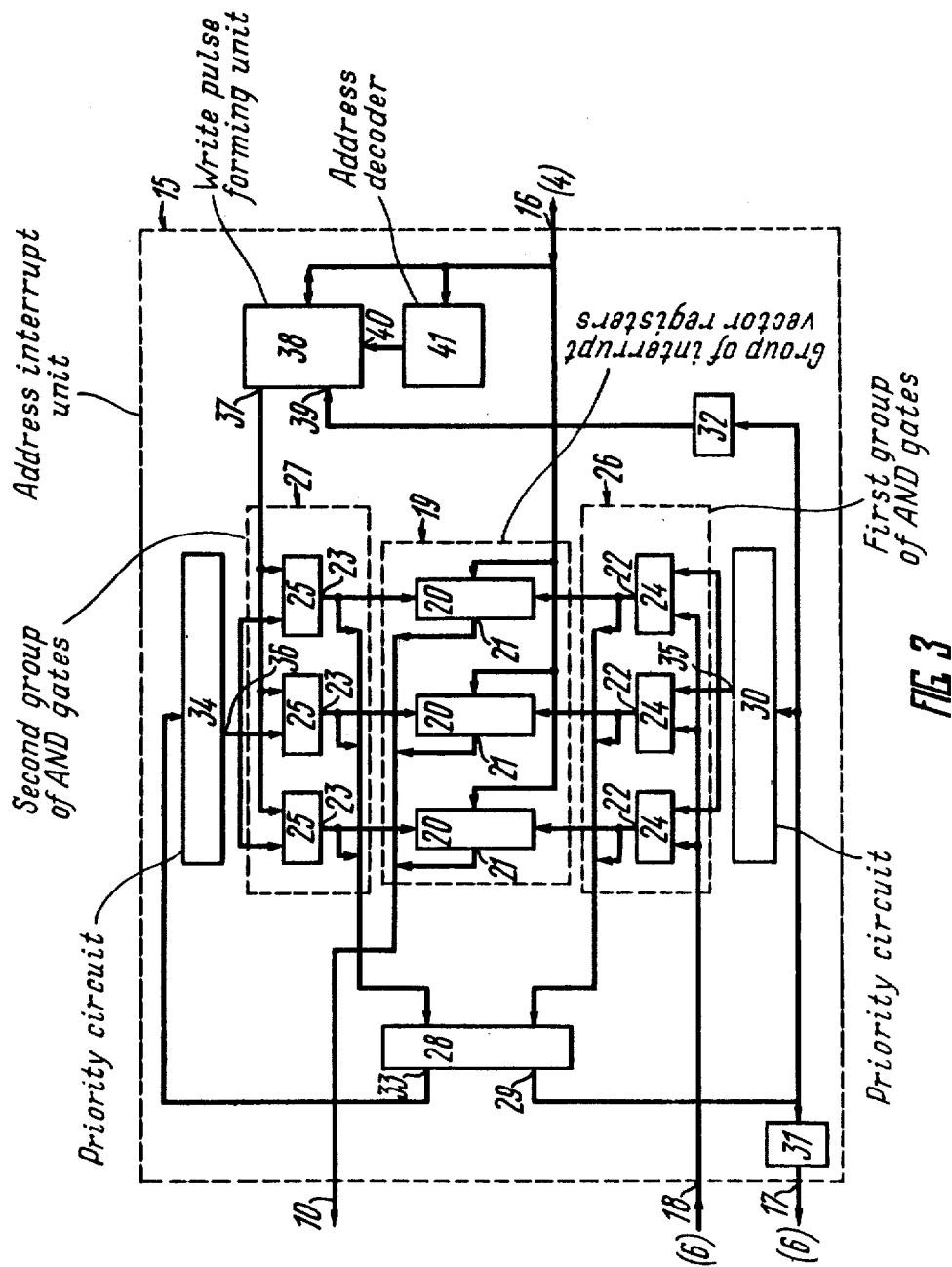
FIG. 3 is a block diagram of an address interrupt unit in accordance with the invention.

The write pulse forming unit 38 (FIG. 5) operates as follows. Upon receiving the signal from the data address and control signal transmission line 4, the univibrator 55 produces a pulse indicating the validity of the information. In the initial state, with "0" at the input 58 of the univibrator 55, the inverter 57 causes "1" to appear at the second input 60 of the NOR gate 61; "0" appears at the output of the NOR gate 61 and at the output of the delay circuit 56. Upon the arrival of a "0" signal at the input 58 of the univibrator 55, "0" is produced at the output of the inverter 57, and "0" is maintained at the output of the delay circuit 56, but "1" is produced at the output of the NOR gate 61. The "1" signal is applied from the output of the delay circuit 56 to the second input 59 of the NOR gate 61 so that "0" is again caused to appear at its output. Thus a pulse is produced of a duration equal to the delay time of the circuit 56. This pulse is applied to the first inputs of the AND gates 63 and 64 whose second inputs receive a signal from the output of the address decoder 41 (FIG. 3). With a "0" signal at the second input of the write pulse forming unit 38, the pulse is passed through the first AND gate 63 (FIG. 5); with a "1" signal at the second input of the write pulse forming unit 38, the pulse is passed through the second AND gate 64.

From the output of the first AND gate 63, the pulse is applied to the output 37 of the write pulse forming unit 38 and to the first input 68 of the flip-flop 69, whereby the latter is set. The signal at the output 70 of the flip-flop 69 confirms the reception of the interrupt vector by the address interrupt unit 15 (FIG. 2). When the exchange of information over the data address and control signal transmission line 4 is completed, the flip-flop 69 (FIG. 5) is reset by a signal arriving at its second input 71. The pulse at the output 67 of the second AND gate 64 serves to indicate that all the registers 20 (FIG. 3) of the group 19 of interrupt vector registers are full. In such a case the processor 1 (FIG. 1), which transmits an interrupt vector, must repeat the write operation after some time. This rules out losses of interrupts if an interrupt vector is entered in the register 20 (FIG. 3) of the group 19 without the previous interrupt being realized.

The control unit 6 (FIG. 4) produces a sequence of control signals at its control outputs in accordance with a program stored in the microprogram storage 42. Each next microinstruction is selected from the microprogram storage 42 in accordance with an instruction and stored in the instruction register 43 and transmitted over the processor data bus 10, in accordance with the information on the processor status stored in the processor status register 9 (FIG. 2) and transmitted to the third input 53 (FIG. 4) of the microprogram storage 42. The microcommand is selected in accordance with an interrupt signal applied to the fourth input 54 of the storage 42, and in accordance with the contents of the current microinstruction address register 51.

The output information of the microprogram storage 42 is a microinstruction entered in the microinstruction register 46 and transmitted to the first control output 11 and second control output of the control unit 6, and the next microinstruction address which is temporarily stored in the next microinstruction address register 49 and then transferred to the currect microinstruction address register 51. Thus a connection between individual microinstructions and microprograms is established.

An interrupt signal at the input 54 of the microprogram storage 42 initiates the selection of an interrupt processing microprogram. This microprogram includes the transmission of an interrupt vector from the address interrupt unit 15 (FIG. 2) over the processor data bus 10; for this purpose, a "1" signal is produced at the second output of the control unit 6.

In summary, the invention raises the throughput of a data processing system by dispensing with the scanning of memory locations. The invention also simplifies the programming of interaction between the processors. The interaction between the processors is effected with the aid of a single data address and control signal transmission line, which reduces the amount of hardware in the system.

What is claimed is:

1. A data processing system for handling multiple tasks and comprising: at least two processors intended for data processing; a memory unit for storing programs and data; an input/output unit; and a data address and control signal transmission line connected to said processors, said memory unit and said input/output unit;

wherein each of said processors comprises:

an arithmetic-logic unit performing arithmetic and logic operations in the course of data processing and having a control input and an input/output means;

a scratch pad memory storing intermediate results in the course of data processing and having a control input;

a processor status register storing the current status word of said processor and having a control input, and output and an input/output means connected to said input/output means of said arithmetic-logic unit;

an interface means to ensure interaction between said processor and said memory unit, said input/output unit and each of the processors over said data address and control signal transmission line, and having a control input and an input/output means connected to said data address and control signal transmission line;

an address interrupt unit to interrupt the execution of a program by said processor through using means for addressing memory locations of the processor, and having an input/output means connected to said data address and control signal transmission line, an input, a first output and a second output;

a control unit to form signals to control said arithmetic-logic unit, said scratch pad memory, said interface means, said processor status register and said address interrupt unit in the course of data processing, and having a first control output connected to said control inputs of said arithmetic-logic unit, said scratch pad memory, said interface means and said processor status register, a first input connected to said output of said processor status register, a second input connected to said second output of said address interrupt unit, and a second control output connected to said input of said address interrupt unit; and a processor data bus to interconnect said arithmetic-logic unit, said scratch pad memory, said processor status register and said interface means, and connected to said first output of said address interrupt unit;

wherein said address interrupt unit comprises:

a group of interrupt vector registers, each of said interrupt vector registers having an input connected to said input/output means of said address interrupt unit, an output connected to said first output of said address interrupt unit, a first control input and a second control input;

a first group of AND gates, each of said AND gates having an output connected to said first control input of a respective register of said group of interrupt vector registers, a first input, and a second input connected to said input of said address interrupt unit;

a second group of AND gates, each of said AND gates having an output connected to said second control input of a respective register of said group of interrupt vector registers, a first input, and a second input;

a first priority circuit having an output connected to said first input of each of said AND gates of said first group of AND gates, and an input;

a second priority circuit having an output connected to said first input of each of said AND gates of said second group of AND gates, and an input;

an AND gate having an input and an output;

an OR gate having an output connected to said second output of said address interrupt unit, and an input;

a status register having a first input connected to said outputs of each of said AND gates of said first group of AND gates, a second input connected to said outputs of each of said AND gates of said second group of AND gates, a first output connected to said input of said first priority circuit, to said input of said AND gate and to said input of said OR gate, and a second output connected to said input of said second priority circuit;

a write pulse forming unit having a first input connected to said output of said AND gate, an output connected to said second input of each of said AND gates of said second group of AND gates, an input/output means connected to said input/output means of said address interrupt unit, and a second input; and an address decoder having an output connected to said second input of said write pulse forming unit, and an input connected to said input/output means of said address interrupt unit.

2. A data processing system as claimed in claim 1, wherein said control unit comprises:

an instruction register having an output, and an input connected to said processor data bus;

a microprogram storage comprising a programmable logic matrix and having a first input connected to said output of said instruction register, a first output, a second output, a second input, and a third input and a fourth input connected to said first input and said second input, respectively, of said control unit;

a microinstruction register having an input connected to said first output of said microprogram storage, and an output connected to said first control output and said second control output of said control unit;

a current microinstruction address register having an input, and an output connected to said second input of said microprogram storage; and a next microinstruction address register having an input connected to said second output of said microprogram storage, and an output connected to said input of said current microinstruction address register.

3. A data processing system as claimed in claim 1, wherein said write pulse forming unit comprises:

a univibrator having an input connected to said input/output means of said write pulse forming unit, and an output, wherein said univibrator comprises: a delay circuit having an input connected to said input of said univibrator, and an output; an inverter of said univibrator having an input connected to said input of said univibrator, and an output; and a NOR gate having a first input connected to said output of said delay circuit, a second input connected to said output of said inverter, and an output connected to said output of said univibrator;

a first AND gate having a first input connected to said output of said univibrator, a second input connected to said second input of said write pulse forming unit, a third input, and an output connected to said output of said write pulse forming unit;

a second AND gate having a first input connected to said output of said univibrator, a second input connected to said second input of said write pulse forming unit, third input connected to said first input of said write pulse forming unit, and an output connected to said input/output means of said write pulse forming unit;

a flip-flop having a first input connected to said output of said first AND gate, and a second input and an output connected to said input/output means of said write pulse forming unit; and an inverter having an output connected to said third input of said first AND gate, and an input connected to said first input of said write pulse forming unit.

* * * * *